United States Patent
Lin et al.

(10) Patent No.: US 11,442,662 B2
(45) Date of Patent: Sep. 13, 2022

(54) DATA WRITING METHOD, MEMORY CONTROL CIRCUIT UNIT AND MEMORY STORAGE APPARATUS

(71) Applicant: PHISON ELECTRONICS CORP., Miaoli (TW)

(72) Inventors: Ping-Chuan Lin, Taipei (TW); Hsiang-Jui Huang, New Taipei (TW); Ping-Yu Hsieh, Tainan (TW); Tsung-Ju Wu, New Taipei (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 16/880,985

(22) Filed: May 22, 2020

(65) Prior Publication Data

US 2021/0342097 A1 Nov. 4, 2021

(30) Foreign Application Priority Data

Apr. 30, 2020 (TW) .................... 109114580

(51) Int. Cl.
*G06F 3/06* (2006.01)
(52) U.S. Cl.
CPC .............. *G06F 3/0659* (2013.01); *G06F 3/06* (2013.01); *G06F 3/0604* (2013.01); *G06F 3/065* (2013.01); *G06F 3/0652* (2013.01); *G06F 3/0679* (2013.01)
(58) Field of Classification Search
CPC .... G06F 3/00659; G06F 3/0604; G06F 3/065; G06F 3/0652; G06F 3/0679
See application file for complete search history.

(56) References Cited

U.S. PATENT DOCUMENTS

| | | | |
|---|---|---|---|
| 9,501,392 B1* | 11/2016 | Weingarten | G06F 12/023 |
| 2012/0226962 A1 | 9/2012 | Franceschini et al. | |
| 2013/0138870 A1* | 5/2013 | Yoon | G11C 16/349 |
| | | | 711/103 |
| 2015/0193302 A1* | 7/2015 | Hyun | G06F 11/108 |
| | | | 714/764 |
| 2015/0268872 A1* | 9/2015 | Ding | G06F 3/0655 |
| | | | 711/103 |
| 2019/0235785 A1* | 8/2019 | Akers | G06F 3/0679 |
| 2021/0334211 A1* | 10/2021 | Duan | G11C 11/5671 |

FOREIGN PATENT DOCUMENTS

| | | |
|---|---|---|
| TW | 201441816 | 11/2014 |
| TW | 201814528 | 4/2018 |
| TW | 201945927 | 12/2019 |

OTHER PUBLICATIONS

Office Action of Taiwan Counterpart Application, dated May 13, 2021, pp. 1-12.
"Office Action of China Counterpart Application", dated Nov. 11, 2021, p. 1-p. 7.

* cited by examiner

Primary Examiner — Nanci N Wong
(74) Attorney, Agent, or Firm — JCIPRNET

(57) ABSTRACT

A data writing method, a memory control circuit unit, and a memory storage apparatus are provided. The method includes: receiving a write command from a host system; and determining whether to write a data corresponding to the write command into a first area or a second area according to a write amplification factor of the first area, where if it is determined to write the data into the second area, copying the written data to the first area after writing the data.

30 Claims, 9 Drawing Sheets

| Lower physical programming unit | Middle physical programming unit | Upper physical programming unit |
|---|---|---|
| 0 | 1 | 2 |
| 3 | 4 | 5 |
| 6 | 7 | 8 |
| 9 | 10 | 11 |
| 12 | 13 | 14 |
| ⋮ | ⋮ | ⋮ |
| 255 | 256 | 257 |

DATA WRITING METHOD, MEMORY CONTROL CIRCUIT UNIT AND MEMORY STORAGE APPARATUS

CROSS-REFERENCE TO RELATED APPLICATION

This application claims the priority benefit of Taiwan application serial no. 109114580, filed on Apr. 30, 2020. The entirety of the above-mentioned patent application is hereby incorporated by reference herein and made a part of this specification.

BACKGROUND

Field of the Disclosure

The disclosure relates to a memory control technology, and in particular to a data writing method, a memory control circuit unit and a memory storage apparatus.

Description of Related Art

Digital cameras, mobile phones and MP3 players have been developed rapidly in the past few years, and therefore consumers' demand for storage media is increasing fast as well. Since rewritable non-volatile memory module (for example, flash memory) has the characteristics of non-volatile data, power saving, small size, and no mechanical structure, it is very suitable for being embedded in the various portable multi-media devices listed above.

Depending on the number of bits that each memory cell can store, NAND flash memory modules can be divided into single-level cell (SLC) NAND flash memory module, multi-level cell (MLC) NAND flash memory module and trinary level cell (TLC) NAND flash memory module, wherein each memory cell of the SLC NAND flash memory module can store data of 1 bit (i.e., "1" and "0"), each memory cell of the MLC NAND flash memory module can store data of 2 bits, and each memory cell of the TLC NAND flash memory module can store data of 3 bits. In addition, the memory cells of the MLC NAND flash memory module and the TLC NAND flash memory module can also be utilized to simulate the SLC NAND flash memory module, and the memory cell in the MLC NAND flash memory module and the TLC NAND flash memory module used to simulate the SLC NAND flash memory module can only store data of 1 bit.

In general, some physical erasing units in the MLC or TLC NAND flash memory module may be chosen to simulate the SLC NAND flash memory module. In the process of writing data to the MLC or TLC NAND flash memory module, a physical programming unit group in a physical erasing unit used to simulate the SLC NAND flash memory module may be chosen, and a first programming mode (also referred to as a single-page programming mode) is adopted to write the data into the selected physical programming unit group, such that each of the multiple memory cells of the selected physical programming unit group only stores data of 1 bit. For example, in the multiple memory cells of the selected physical programming unit group, only the least significant bit (LSB) is used to store data. That is to say, if the MLC or TLC NAND flash memory module is adopted to simulate the SLC NAND flash memory module, only the "lower physical programming unit" can be used to write (or store) data when using the first programming mode for writing. In addition, the middle physical programming unit and the upper physical programming unit corresponding to the lower physical programming unit used to write data will not be used to store data.

It should be noted that because the lower physical programming unit writes faster, so when using the MLC or TLC NAND flash memory module to simulate the SLC NAND flash memory module, usually a higher write performance can be achieved. However, due to the physical characteristics of flash memory, when using the MLC NAND flash memory module (or TLC NAND flash memory module) to simulate the SLC NAND flash memory module, wear of flash memory module usually occurs, which consequently reduces the service life of the flash memory module. For example, the erasing counts (or frequency) of the physical erasing units used to simulate the SLC NAND flash memory module may be higher, which may cause wear of flash memory module.

Based on the above, how to avoid reduction of the service life of flash memory module due to simulation of SLC NAND flash memory module is the goal to be attained by practitioners in the art.

SUMMARY OF THE DISCLOSURE

The disclosure provides a data writing method for a memory storage apparatus, the memory storage apparatus has a rewritable non-volatile memory module, the rewritable non-volatile memory module includes a plurality of areas, each of the plurality of areas includes a plurality of physical erasing units, and each of the plurality of physical erasing units has a plurality of memory cells. The data writing method includes: receiving a write command from a host system; and determining whether to write the data corresponding to the write command into the first area or a second area according to a write amplification factor of the first area, wherein if it is determined to write the data into the second area, the written data is copied to the first area after writing the data.

In an embodiment of the disclosure, the step of determining whether to write the data corresponding to the write command into the first area or the second area according to the write amplification factor of the first area includes: when the write amplification factor is greater than a preset threshold, writing the data into the second area; and when the write amplification factor is not greater than the preset threshold, writing the data into the first area.

In an embodiment of the disclosure, if it is determined to write the data into the first area, the first programming mode and the second programming mode are adopted to program the plurality of memory cells in the first area.

In an embodiment of the disclosure, the number of bits stored by the memory cells programmed in the first programming mode is less than the number of bits stored by the memory cells programmed in the second programming mode.

In an embodiment of the disclosure, the step of using the first programming mode and the second programming mode to program the plurality of memory cells in the first area includes: using the first programming mode to program the plurality of memory cells in the first area; and copying the data of the plurality of physical erasing units written into the first area to one of the plurality of physical erasing units in the first area by using the second programming mode through a copyback operation.

In an embodiment of the disclosure, if it is determined to write the data into the second area, the first programming mode is adopted to program the plurality of memory cells in the second area.

In an embodiment of the disclosure, the step of copying the written data into the first area after writing the data includes: copying the data of the plurality of physical erasing units written into the second area to one of the plurality of physical erasing units in the first area by using the second programming mode through a copyback operation.

In an embodiment of the disclosure, the method further includes: determining to execute the first write mode or the second write mode according to the life cycle parameters of the rewritable non-volatile memory module, wherein in the first write mode, the corresponding data is written into the first area, and in the second write mode, the data is written into the first area or the second area according to the write amplification factor of the first area.

In an embodiment of the disclosure, the number of bits stored by the memory cells in the first area is greater than the number of bits stored by the memory cells in the second area.

In an embodiment of the disclosure, the plurality of areas respectively have corresponding storage capacities, and when calculating the space size of the rewritable non-volatile memory module, the space size does not include the storage capacity corresponding to the second area.

The disclosure provides a memory control circuit unit, the memory control circuit unit includes a host interface, a memory interface and a memory management circuit. The host interface is configured to be coupled to a host system. The memory interface is configured to be coupled to a rewritable non-volatile memory module, wherein the rewritable non-volatile memory module includes a plurality of areas, each of the plurality of areas includes a plurality of physical erasing units, each of the plurality of physical erasing units has a plurality of memory cells. The memory management circuit is coupled to the host interface and the memory interface. The memory management circuit is configured to receive a write command from the host system, and the memory management circuit is further configured to determine whether to write the data corresponding to the write command into the first area or a second area according to a write amplification factor of the first area, wherein if it is determined to write the data into the second area, the written data is copied into the first area after writing the data.

In an embodiment of the disclosure, in the operation that the memory management circuit is further configured to determine whether to write the data corresponding to the write command into the first area or the second area according to the write amplification factor of the first area, when the write amplification factor is greater than a preset threshold, the data is written into the second area, and when the write amplification factor is not greater than the preset threshold, the data is written into the first area.

In an embodiment of the disclosure, if it is determined to write the data into the first area, the memory management circuit is further configured to use the first programming mode and the second programming mode to program the plurality of memory cells in the first area.

In an embodiment of the disclosure, number of bits stored by the memory cells programmed by the memory management circuit in the first programming mode is less than the number of bits stored by the memory cells programmed in the second programming mode.

In an embodiment of the disclosure, in the operation that the memory management circuit is further configured to use the first programming mode and the second programming mode to program the plurality of memory cells in the first area, the first programming mode is used to program the plurality of memory cells in the first area, and the data of the plurality of physical erasing units written into the first area is copied into one of the plurality of physical erasing units of the first area by using the second programming mode through a copyback operation.

In an embodiment of the disclosure, if it is determined to write the data into the second area, the memory management circuit is further configured to use the first programming mode to program the plurality of memory cells in the second area.

In an embodiment of the disclosure, in the operation of copying the written data into the first area after writing the data, the memory management circuit is further configured to copy the data of the plurality of physical erasing units written into the second area into one of the plurality of physical erasing units of the first area by using the second programming mode through the copyback operation.

In an embodiment of the disclosure, the memory management circuit is further configured to determine whether to execute the first write mode or the second write mode according to the life cycle parameters of the rewritable non-volatile memory module. In the first write mode, the corresponding data is written into the first area, and in the second write mode, it is determined whether to write the data into the first area or the second area according to the write amplification factor of the first area.

In an embodiment of the disclosure, the number of bits stored by the memory cells in the first area is greater than the number of bits stored by the memory cells in the second area.

In an embodiment of the disclosure, the plurality of areas respectively have corresponding storage capacities, and when the memory management circuit calculates the space size of the rewritable non-volatile memory module, the space size does not include the storage capacity corresponding to the second area.

The disclosure provides a memory storage apparatus, the memory storage apparatus includes a connection interface unit, a rewritable non-volatile memory module and a memory control circuit unit. The connection interface unit is configured to be coupled to the host system. The rewritable non-volatile memory module includes a plurality of areas, each of the plurality of areas includes a plurality of physical erasing units, and each of the plurality of physical erasing units has a plurality of memory cells. The memory control circuit unit is coupled to the connection interface unit and the rewritable non-volatile memory module. The memory control circuit unit is configured to receive a write command from the host system, and the memory control circuit unit is further configured to determine whether to write the data corresponding to the write command into the first area or the second area according to the write amplification factor of the first area, wherein it is determined to write the data into the second area, the written data is copied into the first area after writing the data.

In an embodiment of the disclosure, in the operation that the memory control circuit unit is further configured to determine whether to write the data corresponding to the write command into the first area or the second area according to the write amplification factor of the first area, when the write amplification factor is greater than a preset threshold, the data is written into the second area, and when the write amplification factor is not greater than the preset threshold, the data is written into the first area.

In an embodiment of the disclosure, if it is determined to write the data into the first area, the memory control circuit unit is further configured to use the first programming mode and the second programming mode to program the plurality of memory cells in the first area.

In an embodiment of the disclosure, the number of bits stored by the memory cells programmed in the first programming mode by the memory control circuit unit is less than the number of bits stored by the memory cells programmed in the second programming mode.

In an embodiment of the disclosure, in the operation that the memory control circuit unit is further configured to use the first programming mode and the second programming mode to program the plurality of memory cells in the first area, the first programming mode is used to program the plurality of memory cells in the first area, and the data of the plurality of physical erasing units written into the first area is copied into one of the plurality of physical erasing units of the first area by using the second programming mode through a copyback operation.

In an embodiment of the disclosure, if it is determined to write the data into the second area, the memory control circuit unit is further configured to use the first programming mode to program the plurality of memory cells in the second area.

In an embodiment of the disclosure, in the operation of copying the written data into the first area after writing the data, the memory control circuit unit is further configured to copy the data of the plurality of physical erasing units written into the second area to one of the plurality of physical erasing units in the first area by using the second programming mode through a copyback operation.

In an embodiment of the disclosure, the memory control circuit unit is further configured to determine whether to execute the first write mode or the second write mode according to the life cycle parameters of the rewritable non-volatile memory module. In the first write mode, the corresponding data is written into the first area, and in the second write mode, it is determined whether to write the data into the first area or the second area according to the write amplification factor of the first area.

In an embodiment of the disclosure, the number of bits stored by the memory cells in the first area is greater than the number of bits stored by the memory cells in the second area.

In an embodiment of the disclosure, the plurality of areas respectively have corresponding storage capacities, and when the memory control circuit unit calculates the space size of the rewritable non-volatile memory module, the space size does not include the storage capacity corresponding to the second area.

Based on the above, the data writing method, the memory control circuit unit and the memory storage apparatus in the embodiment of the disclosure can calculate the current write amplification factor in a dynamic area and dynamically decide whether to write data into the dynamic area or a static area according to the calculated write amplification factor. In this way, the embodiment of the disclosure affects the value of write amplification factor by adjusting the ratio of data written into the dynamic area or the static area, thereby controlling the service life of the dynamic area and the static area to prevent the static area from reaching the end of service life early, such that the two areas can simultaneously reach the end of service life.

In order to make the above features and advantages of the disclosure more comprehensible, the following specific examples are provided and described in detail with reference to accompanying drawings.

DESCRIPTION OF EMBODIMENTS

In general, a memory storage apparatus (also referred to as memory storage system) includes a rewritable non-volatile memory module and a controller (also referred to as control circuit unit). Typically the memory storage apparatus is used together with the host system, so that the host system can write data into the memory storage apparatus or read data from the memory storage apparatus.

Figure 1:
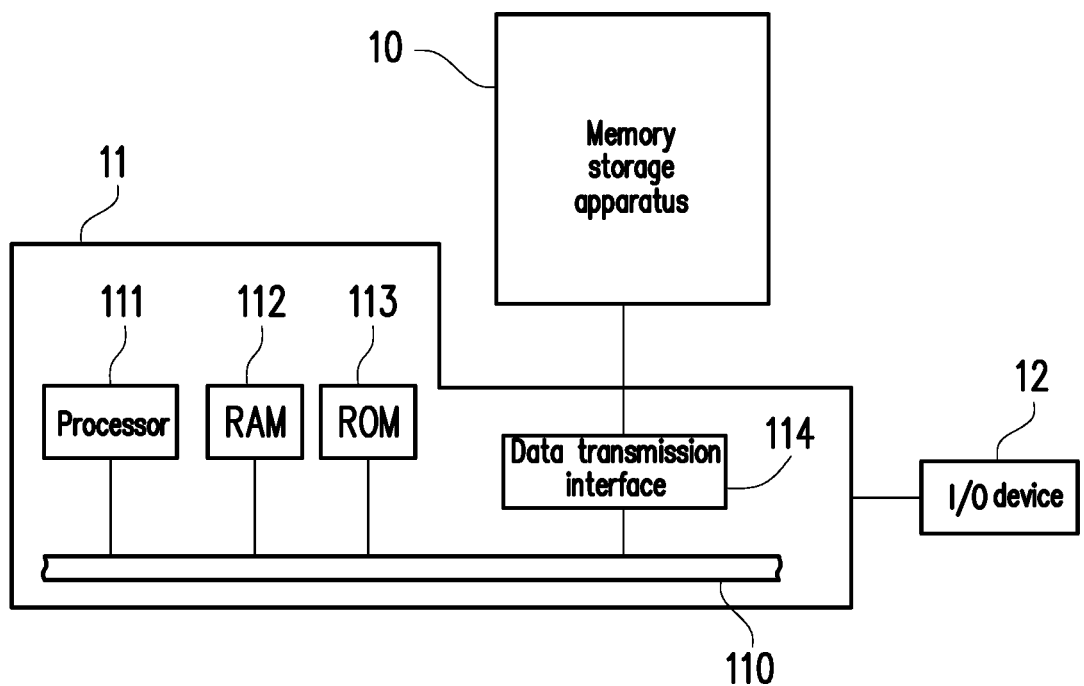
FIG. 1 is a schematic view of a host system, a memory storage apparatus, and an input/output (I/O) device according to an exemplary embodiment.
Figure 2:
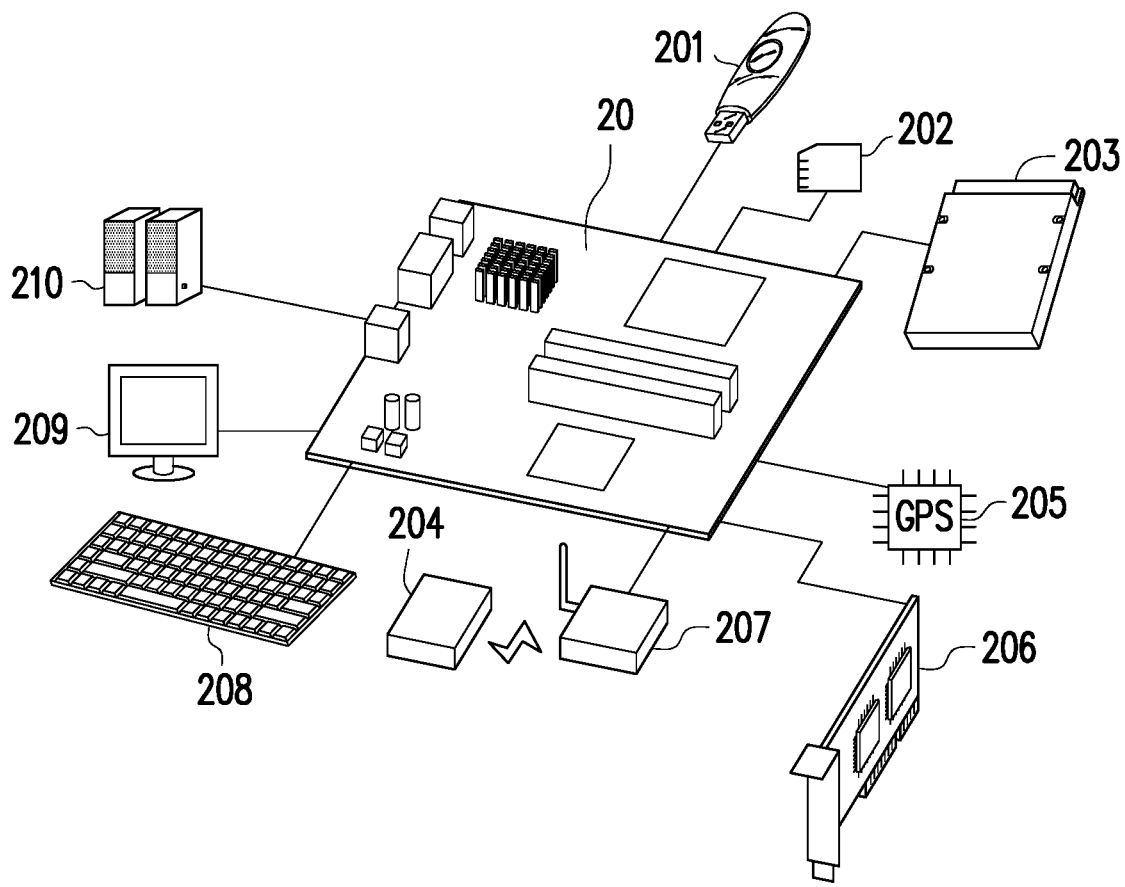
FIG. 2 is a schematic view of a host system, a memory storage apparatus, and an input/output (I/O) device according to another exemplary embodiment.

FIG. 1 is a schematic view of a host system, a memory storage apparatus, and an input/output (I/O) device according to an exemplary embodiment, and FIG. 2 is a schematic view of a host system, a memory storage apparatus, and an input/output (I/O) device according to another exemplary embodiment.

Referring to FIG. 1 and FIG. 2, a host system 11 generally includes a processor 111, a random access memory (RAM) 112, a read-only memory (ROM) 113, and a data transmission interface 114. The processor 111, the random access memory 112, the read-only memory 113 and the data transmission interface 114 are coupled to a system bus 110.

In this exemplary embodiment, the host system 11 is coupled to the memory storage apparatus 10 through the data transmission interface 114. For example, the host system 11 can write data into or read data from the memory storage apparatus 10 through the data transmission interface 114. In addition, the host system 11 is coupled to the I/O device 12 through the system bus 110. For example, the host system 11 can transmit output signals to or receive input signals from the I/O device 12 through the system bus 110.

In this exemplary embodiment, the processor 111, the random access memory 112, the read-only memory 113 and the data transmission interface 114 may be disposed on a motherboard 20 of the host system 11. The number of data transmission interfaces 114 can be one or more. Through the data transmission interface 114, the motherboard 20 can be coupled to the memory storage apparatus 10 in a wired or wireless manner. The memory storage apparatus 10 may be, for example, a flash drive 201, a memory card 202, a solid state drive (SSD) 203, or a wireless memory storage apparatus 204. The wireless memory storage apparatus 204 may be a memory storage apparatus based on various wireless communication technologies, such as a near field communication storage (NFC) memory storage apparatus, a wireless facsimile (Wi-Fi) memory storage apparatus, a Bluetooth memory storage apparatus, or a low-power Bluetooth memory storage apparatus (for example, iBeacon). In addition, the motherboard 20 can also be coupled to various I/O devices such as a Global Positioning System (GPS) module 205, a network interface card 206, a wireless transmission device 207, a keyboard 208, a screen 209, a speaker 210, etc. through the system bus 110. For example, in an exemplary embodiment, the motherboard 20 can access the wireless memory storage apparatus 204 through the wireless transmission device 207.

Figure 3:
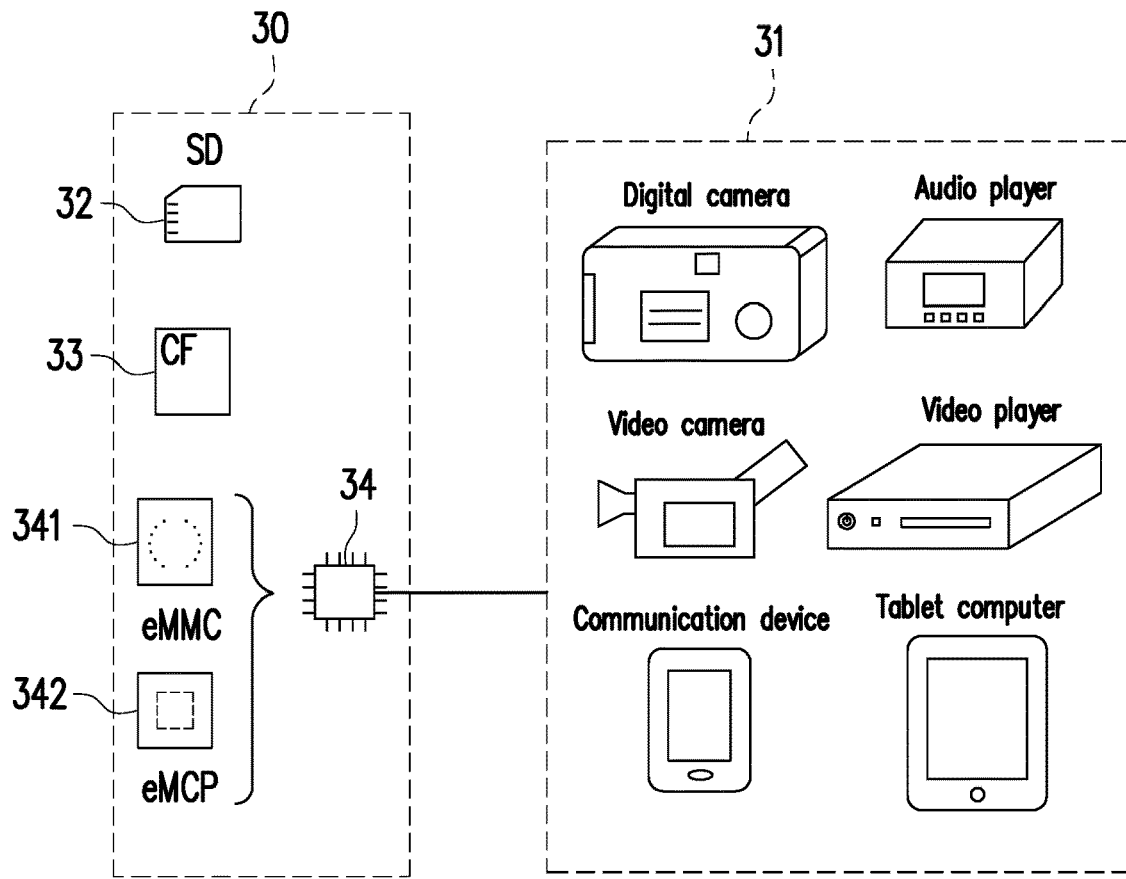
FIG. 3 is a schematic view of a host system and a memory storage apparatus according to another exemplary embodiment.

In an exemplary embodiment, the host system is any system that can substantially cooperate with a memory storage apparatus to store data. Although in the above exemplary embodiment, the host system is described as a computer system, however, FIG. 3 is a schematic view of a host system and a memory storage apparatus according to another exemplary embodiment. Please refer to FIG. 3, in another exemplary embodiment, the host system 31 may also be a digital camera, a video camera, a communication device, an audio player, a video player, or a tablet computer, etc., and the memory storage apparatus 30 may be various non-volatile memory storage apparatuses such as SD card 32, CF card 33 or embedded storage apparatus 34 used by the host system 31. The embedded storage apparatus 34 includes embedded MMC (eMMC) 341 and/or embedded multi-chip package (eMCP) storage apparatus 342 and other types of embedded storage apparatuses in which the memory module is directly coupled to the substrate of the host system.

Figure 4:
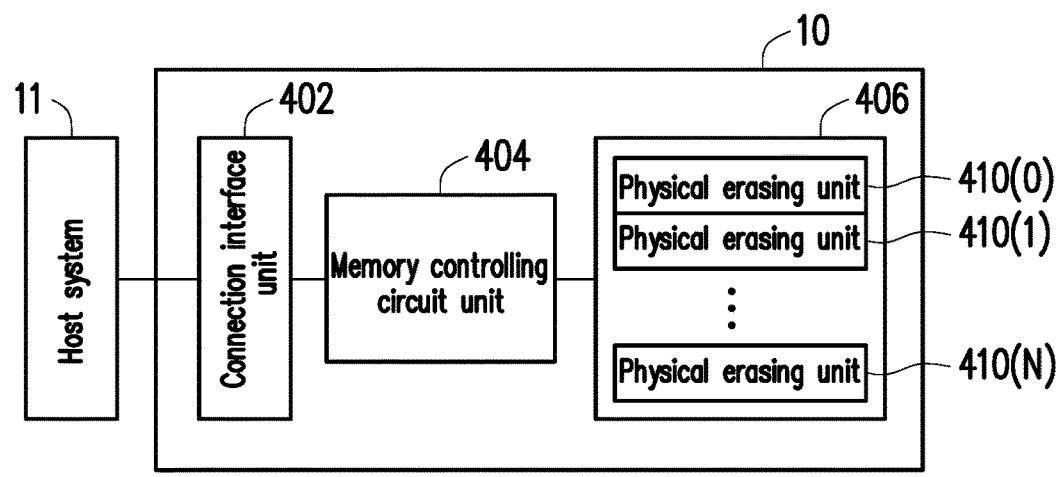
FIG. 4 is a schematic block view of a host system and a memory storage apparatus according to an exemplary embodiment.

FIG. 4 is a schematic block view of a host system and a memory storage apparatus according to an exemplary embodiment.

Please refer to FIG. 4, the memory storage apparatus 10 includes a connection interface unit 402, a memory control circuit unit 404 and a rewritable non-volatile memory module 406.

In this exemplary embodiment, the connection interface unit 402 is compatible with Serial Advanced Technology Attachment (SATA) standard. However, it should be understood that the disclosure is not limited thereto, and the connection interface unit 402 may also conform to the Parallel Advanced Technology Attachment (PATA) standard, Institute of Electrical and Electronic Engineers (IEEE) 1394 standard, Peripheral Component Interconnect Express (PCI Express) standard, Universal Serial Bus (USB) standard, Ultra High Speed-I (UHS-I) interface standard, Ultra High Speed-II (UHS-II) interface standard, Secure Digital (SD) interface standard, Memory Stick (MS) interface standard, Multi-Chip Package interface standard, Multimedia Card (MMC) interface standard, Embedded Multimedia Card (eMMC) interface standard, Universal Flash Storage (UFS) interface standard, embedded multi-chip package (eMCP) interface standard, Compact Flash (CF) interface standard, Integrated Device Electronics (IDE) standard or other suitable standards. In the exemplary embodiment, the connection interface unit 402 can be packaged in a chip with the memory control circuit unit 404, or the connection interface unit 402 can be arranged outside a chip containing the memory control circuit unit.

The memory control circuit unit 404 is configured to execute a plurality of logic gates or control commands implemented in the form of hardware or firmware, and perform data writing, data reading and data erasing operations in the rewritable non-volatile memory module 406 according to the commands of the host system 11.

The rewritable non-volatile memory module 406 is coupled to the memory control circuit unit 404 and is configured to store data written by the host system 11. The rewritable non-volatile memory module 406 has physical erasing units 410(0) to 410(N). For example, the physical erasing units 410(0) to 410(N) may belong to the same memory die or belong to different memory die. Each physical erasing unit respectively has a plurality of physical programming units, wherein the physical programming units belonging to the same physical erasing unit can be written independently and erased simultaneously. However, it should be understood that the disclosure is not limited thereto, and each physical erasing unit may be composed of 64 physical programming units, 256 physical programming units, or any number of physical programming units.

More specifically, the physical erasing unit is the minimum unit for erasing. Namely, each physical erasing unit contains the least number of memory cells to be erased together. The physical programming unit is the minimum unit for programming. That is, the physical programming unit is the minimum unit for writing data. Each physical programming unit usually includes a data bit area and a redundant bit area. The data bit area having multiple physical access addresses is used to store user data, and the redundant bit area is used to store system data (e.g., control information and error checking and correcting code). In the exemplary embodiment, each data bit area of the physical programming unit contains 8 physical access addresses, and the size of each physical access address is 512 byte. However, in other exemplary embodiments, the data bit area may also contain more or less physical access addresses, and the number and size of the physical access addresses are not limited by the disclosure. For example, in an exemplary embodiment, the physical erasing unit is a physical block, and the physical programming unit is a physical page or a physical sector, but the disclosure is not limited thereto.

In the exemplary embodiment, the rewritable non-volatile memory module 406 may be a SLC (Single Level Cell) NAND flash memory module (i.e., a flash memory module capable of storing one data bit in one memory cell), a MLC (Multi Level Cell) NAND flash memory module (i.e., a flash memory module capable of storing two data bits in one memory cell), a TLC (Trinary Level Cell) NAND flash memory module (i.e., a flash memory module capable of storing three data bits in one memory cell), a QLC (Quad Level Cell) NAND flash memory module (i.e., a flash memory module capable of storing four data bits in one memory cell), other flash memory modules or other memory modules having the same features.

Figures 5A, 5B:
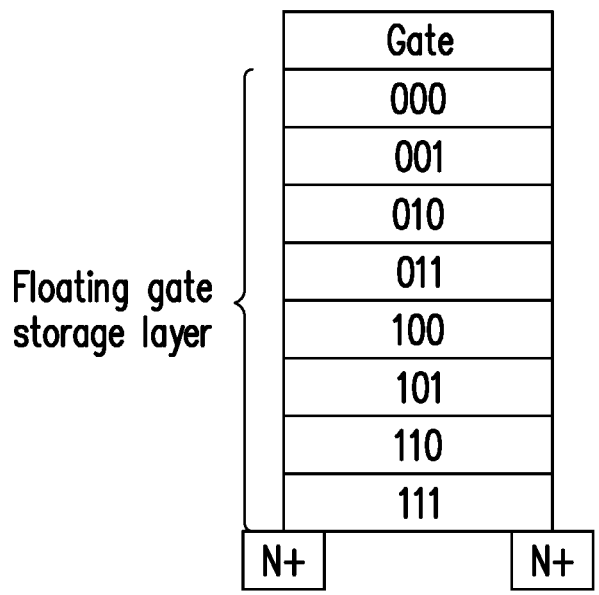
FIG. 5A and FIG. 5B are exemplary schematic views of a memory cell storage structure and a physical erasing unit according to the exemplary embodiment.

FIG. 5A and FIG. 5B are exemplary schematic views of a memory cell storage structure and a physical erasing unit according to the exemplary embodiment.

Please refer to FIG. 5A, the storage state of each memory cell of the rewritable non-volatile memory module 406 can be identified as "111", "110", "101", "100", "011", "010", "001" or "000" (as shown in FIG. 5A), wherein the first bit counted from the left is the LSB, the second bit counted from the left is the CSB, and the third bit counted from the left is the MSB. Additionally, the memory cells arranged on the same word line can constitute three physical programming units. Among them, the physical programming units constituted by the LSBs of said memory cells are known as a lower physical programming unit, the physical programming units constituted by the CSBs of said memory cells are known as a center physical programming unit, and the physical programming units constituted by the MSBs of said memory cells are known as an upper physical programming unit.

Referring to FIG. 5B, one physical erasing unit is constituted by a plurality of physical programming unit groups. Each of the physical programming unit groups includes the lower physical programming unit, the center physical programming unit and the upper physical programming unit constituted by multiple memory cells arranged on the same word line. For example, in the physical erasing unit, the $0^{th}$ physical programming unit belonging to the lower physical programming unit, the $1^{st}$ physical programming unit belonging to the center physical programming unit and the $2^{nd}$ physical programming unit belonging to the upper physical programming unit are regarded as one physical programming unit group. Similarly, the $3^{rd}$, the $4^{th}$, and the $5^{th}$ physical programming units are regarded as one physical programming unit group, and by analogy, the other physical programming units are also grouped into multiple physical programming unit groups by the same method. In other words, in the exemplary embodiment of FIG. 5B, the physical erasing unit includes 258 physical programming units in total, and the lower physical programming unit, the center physical programming unit and the upper physical programming unit constituted by multiple memory cells arranged on the same word line can constitute one physical programming unit group. Therefore, the physical erasing unit of FIG. 5B may be divided into 86 physical programming unit groups in total. However, it should be noted that, the disclosure is not intended to limit the numbers of the physical programming unit or the physical programming unit groups in the physical erasing unit.

Figure 6:
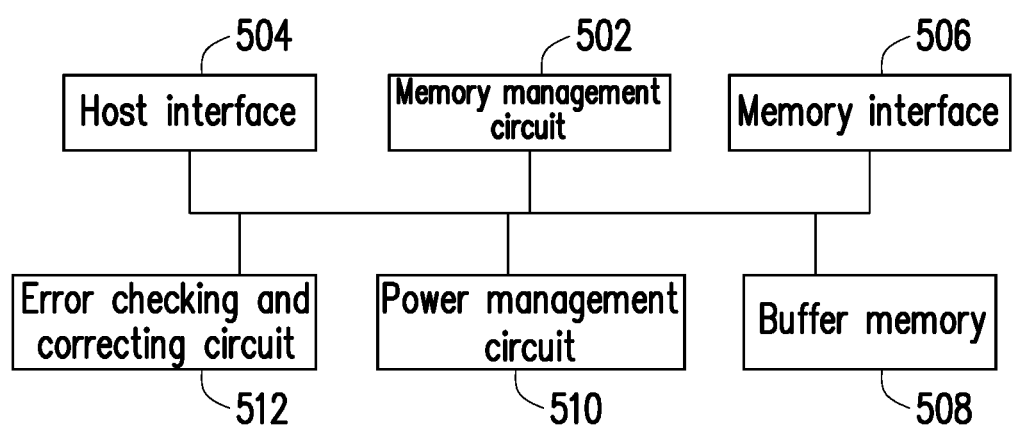
FIG. 6 is a schematic block view of a memory control circuit unit according to an exemplary embodiment.

FIG. 6 is a schematic block view of a memory control circuit unit according to an exemplary embodiment.

Referring to FIG. 6, the memory control circuit unit 404 includes a memory management circuit 502, a host interface 504 and a memory interface 506, a buffer memory 508, a power management circuit 510, and an error checking and correcting circuit 512.

The memory management circuit 502 is configured to control overall operations of the memory control circuit unit 404. Specifically, the memory management circuit 502 has a plurality of control commands and the control commands are executed to perform various operations such as writing, reading and erasing data during operation of the memory storage apparatus 10. The following description regarding the operation of the memory management circuit 502 or any circuit elements included in the memory control circuit unit 404 is equivalent to description regarding the operation of the memory control circuit unit 404.

In the exemplary embodiment, the control commands of the memory management circuit 502 are implemented in form of firmware. For instance, the memory management circuit 502 has a microprocessor unit (not illustrated) and a read-only memory (not illustrated), and the control commands are burnt into the read-only memory. During operation of the memory storage apparatus 10, the control commands are executed by the microprocessor to perform operations of writing, reading or erasing data.

Figure 7:
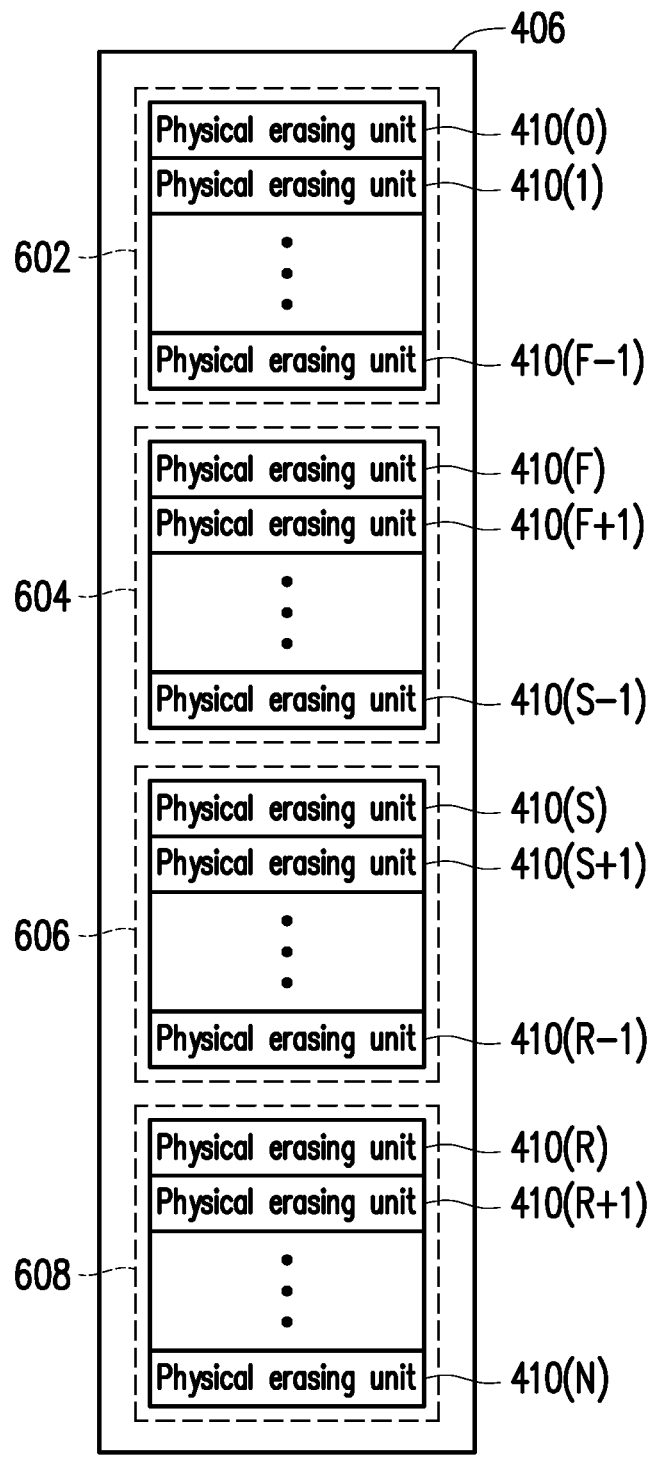
FIG. 7 and FIG. 8 are exemplary schematic views of a management physical erasing unit according to an exemplary embodiment.
Figure 8:
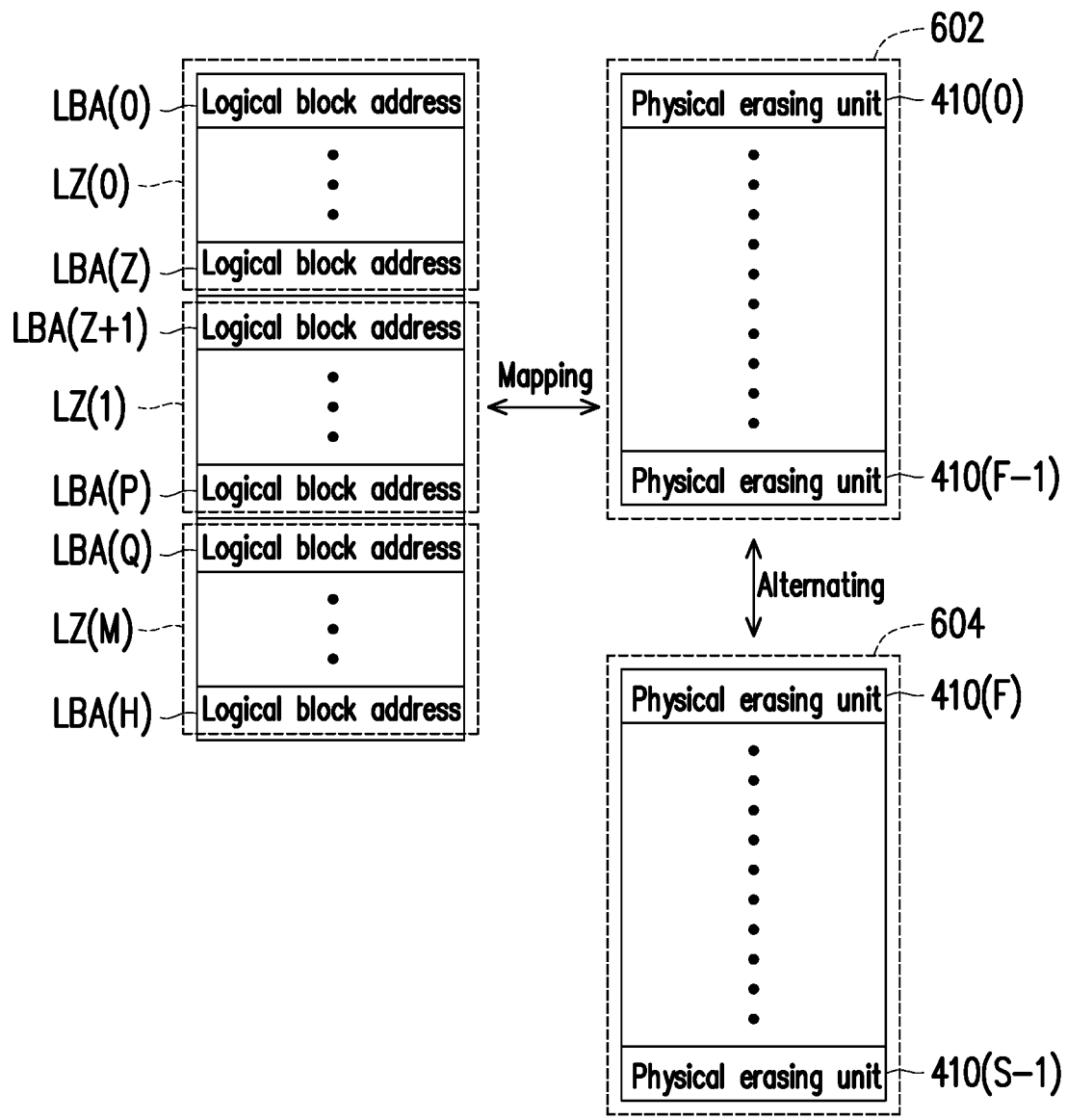

FIG. 7 and FIG. 8 are exemplary schematic views of a management physical erasing unit according to an exemplary embodiment.

It should be understood that terms, such as "retrieve", "group", "divide", "associate" and so forth, are logical concepts which describe operations in the physical erasing units of the rewritable non-volatile memory module 406. In other words, the physical erasing units of the rewritable non-volatile memory module are logically operated, but actual positions of the physical erasing units of the rewritable non-volatile memory module are not changed.

Referring to FIG. 7, the memory control circuit unit 404 (or memory management circuit 502) logically groups the physical erasing units 410(0) to 410(N) into a data area 602, a free area 604, a system area 606 and a replacement area 608. Each of the areas respectively has a corresponding storage capacity.

The physical erasing units logically belonging to the data area 602 and the free area 604 are configured to store data from the host system 11. Specifically, the physical erasing units of the data area 602 are regarded as the physical erasing units already stored with data, and the physical erasing units of the free area 604 are configured to replace the physical erasing units of the data area 602. In other words, when the write command and the data to be written are received from the host system 11, the memory control circuit unit 404 (or memory management circuit 502) retrieves the physical erasing units from the free area 604, and writes the data into the retrieved physical erasing units in order to replace the physical erasing units in the data area 602.

The physical erasing units logically belonging to the system area 606 are configured to record system data. For example, the system data includes information related to manufacturer and model of the rewritable non-volatile memory module, the number of physical erasing units in the rewritable non-volatile memory module, the number of the physical programming units in each physical erasing unit, and the like.

The physical erasing units logically belonging to the replacement area 608 are used in a bad physical erasing unit replacement procedure for replacing damaged physical erasing units. More specifically, if normal physical erasing units are still available in the replacement area 608 when the physical erasing units of the data area 602 are damaged, the memory control circuit unit 404 (or memory management circuit 502) retrieves the normal physical erasing units from the replacement area 608 in order to replace the damaged physical erasing units.

Note that, the number of physical erasing units in the data area 602, the free area 604, the system area 606, and the replacement area 608 will vary according to different memory specifications. In addition, it should be understood that during the operation of the memory storage apparatus 10, the grouping relationship of the physical erasing units associated with the data area 602, the free area 604, the system area 606, and the replacement area 608 will change dynamically. For example, when the physical erasing units in the free area 604 are damaged and replaced by the physical erasing units in the replacement area 608, the physical erasing units in the original replacement area 608 will be associated with the free area 604.

Referring to FIG. 8, the memory control circuit unit 404 (or memory management circuit 502) configures logical block addresses LBA(0) to LBA(H) for mapping the physical erasing units of the data area 602, wherein each of the logical block addresses includes a plurality of logical addresses for mapping to the corresponding physical programming units of the physical erasing units. Further, when the host system 11 intends to write the data into the logical address or update the data stored in the logical address, the memory control circuit unit 404 (or memory management unit 502) retrieves one physical erasing unit from the free area 604 as an actuating physical erasing unit for writing the data, so as to replace the physical erasing unit in the data area 602. Moreover, when the physical erasing unit as the actuating physical erasing unit is fully written, the memory management circuit 502 will then retrieve an empty physical erasing unit from the free area 604 as the actuating physical erasing unit to continue writing the updated data corresponding to the write command from the host system 1000. In addition, when the number of available physical erasing units in the free area 604 is less than the preset value, the memory management circuit 502 performs a garbage collection operation (also referred to as an effective data merge operation) to organize the valid data in the data area 602, so as to re-associate the physical erasing units with no valid data stored in the data area 602 to the free area 604.

In order to identify which of the physical programming units is the data of each logical address being stored to, the memory control circuit unit 404 (or the memory management circuit 502) records mapping relations between the logical addresses and the physical programming units in the exemplary embodiment. For instance, in the exemplary embodiment, the memory control circuit unit 404 (or the memory management circuit 502) may store a logical-to-physical mapping table into the rewritable non-volatile memory module 406 for recording the physical programming units mapped by each of the logical addresses, and the logical-to-physical mapping table is loaded into the buffer memory 508 for maintenance when the memory control circuit unit 404 (or the memory management circuit 502) intends to access the data, and the data is written or read according to the logical-to-physical mapping table.

It should be noted that, the mapping table cannot record the mapping relation for all of the logical addresses because a capacity of the buffer memory 508 is limited. Therefore, in the exemplary embodiment, the memory control circuit unit 404 (or the memory management unit 502) groups the logical block addresses LBA(0) to LBA(H) into a plurality of logical zones LZ(0) to LZ(M), and configures one logical-to-physical mapping table for each of the logical zones. Specifically, when the memory control circuit unit 404 (or the memory management unit 502) intends to update the mapping relation for one specific logical block address, the logical-to-physical mapping table corresponding to the logical zone to which the logical block address belongs is loaded into the buffer memory 508 for updating. Specifically, if the logical-to-physical mapping table corresponding to the logical zone to which the logical block address belongs is not temporarily stored in the buffer memory 508 (that is, the logical-to-physical mapping table temporarily stored in the buffer memory 508 does not record the mapping relation of the logical block address to be updated, the memory control circuit unit 404 (or the memory management circuit 502) performs a mapping table swapping operation to restore the logical-to-physical mapping table temporarily stored in the buffer memory 508 into the rewritable non-volatile memory module 406, and the logical-to-physical mapping table recorded with the logical block address to be updated is loaded into the buffer memory 508.

In another exemplary embodiment of the disclosure, the control commands of the memory management circuit 502 can also be stored in a specific area of the rewritable non-volatile memory module 406 in the form of program code (for example, the system area dedicated to store system data in the memory module). In addition, the memory management circuit 502 has a microprocessor unit (not shown), a read-only memory (not shown) and a random access memory (not shown). Specifically, the read-only memory has a drive code, and when the memory control circuit unit 404 is enabled, the microprocessor unit will first execute the drive code segment to load the control commands stored in the rewritable non-volatile memory module 406 into the random access memory of the memory management circuit 502. Thereafter, the microprocessor unit will run the control commands to write, read, and erase data.

In addition, in another exemplary embodiment of the disclosure, the control commands of the memory management circuit 502 can also be implemented in the form of hardware. For example, the memory management circuit 502 includes a microcontroller, a memory cell management circuit, a memory writing circuit, a memory reading circuit, a memory erasing circuit, and a data processing circuit. The memory cell management circuit, the memory writing circuit, the memory reading circuit, the memory erasing circuit and the data processing circuit are coupled to the microcontroller. Among them, the memory cell management circuit is configured to manage the physical erasing units of the rewritable non-volatile memory module 406; the memory writing circuit is configured to issue write commands to the rewritable non-volatile memory module 406 to write data into the rewritable non-volatile memory module 406; the memory reading circuit is configured to issue read commands to the rewritable non-volatile memory module 406 to read data from the rewritable non-volatile memory module 406; the memory erasing circuit is configured to issue erase commands to the rewritable non-volatile memory module 406 to erase data from the rewritable non-volatile memory module 406; and the data processing circuit is configured to process the data to be written into the rewritable non-volatile memory module 406 and the data read from the rewritable non-volatile memory module 406.

Further referring to FIG. 6, the host interface 504 is coupled to the memory management circuit 502 and is configured to couple to the connection interface unit 402 to receive and identify commands and data transmitted by the host system 11. That is to say, the commands and data transmitted by the host system 11 will be transmitted to the memory management circuit 502 through the host interface 504. In this exemplary embodiment, the host interface 504 is compatible with the SATA standard. However, it should be understood that the disclosure is not limited thereto, the host interface 504 may also be compatible with PATA standard, IEEE 1394 standard, PCI Express standard, USB standard, UHS-I interface standard, UHS-II interface standard, SD standard, MS standard, MMC standard, CF standard, IDE standard or other suitable data transmission standards.

The memory interface 506 is coupled to the memory management circuit 502 and configured to access the rewritable non-volatile memory module 406. That is, the data to be written to the rewritable non-volatile memory module 406 will be converted to a format acceptable to the rewritable non-volatile memory module 406 through the memory interface 506.

The buffer memory 508 is coupled to the memory management circuit 502 and is configured to temporarily store temporary data and commands from the host system 11 or data from the rewritable non-volatile memory module 406.

The power management circuit 510 is coupled to the memory management circuit 502 and configured to control the power of the memory storage apparatus 10.

The error checking and correcting circuit 512 is coupled to the memory management circuit 502 and is configured to perform error check and correction procedures to ensure the accuracy of data. For example, when the memory management circuit 502 receives a write command from the host system 11, the error checking and correcting circuit 512 will generate a corresponding error checking and correcting code (ECC Code) for the data corresponding to the write command, and the memory management circuit 502 writes the data corresponding to the write command and the corresponding ECC code into the rewritable non-volatile memory module 406. Thereafter, when reading data from the rewritable non-volatile memory module 406, the memory management circuit 502 will simultaneously read the ECC code corresponding to the data, and the error checking and correcting circuit 512 will perform the error checking and correcting procedure on the read data according to the ECC code.

It should be noted that, in this exemplary embodiment, the memory management circuit 502 will use different programming modes in different states to program data to the rewritable non-volatile memory module 406. For example, the memory management circuit 502 may use a single-page programming mode (also referred to as a first programming mode) or a multi-page programming mode (also referred to as a second programming mode) to program data to a physical erasing unit. Here, the programming speed of the memory cell based on the single-page programming mode is higher than the programming speed of the memory cell based on the multi-page programming mode (i.e., the operation time required for programming data by using the multi-page programming mode is larger than the operation time required for programming data by using the single-page programming mode), and the reliability of data stored based on the single-page programming mode is often higher than the reliability of data stored based on the multi-page programming mode. The single-page programming mode is, for example, one of a SLC (Single Level Cell) programming mode, a lower physical programming mode, a mixture programming mode and a less level cell programming mode. More specifically, in the single level cell programming mode, one memory cell is only stored with data of one bit. In the lower physical programming mode, only the lower physical programming units are programmed, and the upper physical programming units corresponding to the lower physical programming units may not be programmed. In the mixture programming mode, valid data (or real data) are programmed into the lower physical programming units, and dummy data is programmed into the upper physical programming units corresponding to the lower physical programming units sorted with the valid data. In the less level memory cell mode, one memory cell is stored with a first number of data bits. For example, the first number may be set to "1". The multi-page programming mode is, for example, a multi-level cell (MLC) programming mode, a trinary level cell (TLC) programming mode or a similar mode. In the multi-page programming mode, one memory cell is stored with a second number of data bits, wherein the second number is equal to or greater than "2". For example, the second number may be set to "2" or "3". In another exemplary embodiment, the first number in the single-page programming mode and the second number in the multi-page programming mode can be other numbers, as long as the second number is greater than the first number. In other words, the number of data bits (that is, the first number) stored by each memory cell that constitutes the first type of physical erasing unit after being programmed by using the single-page programming mode will be smaller than the number of data bits (that is, the second number) stored by each memory cell that constitutes the second type of physical erasing unit after being programmed by using the multi-page programming mode.

Based on the above, the number of data bits stored in the memory cell programmed by using the multi-page programming mode is larger than the number of data bits stored in the memory cell programmed by using the single-page programming mode. Therefore, the data capacity of the physical erasing units programmed by using the multi-page programming mode will be larger than the data capacity of the physical erasing units programmed by using the single-page programming mode.

Note that, the following description regarding the operation of the memory control circuit unit 404 may be regarded as being equivalent to the description regarding the operation of the memory management circuit 502.

Figure 9:
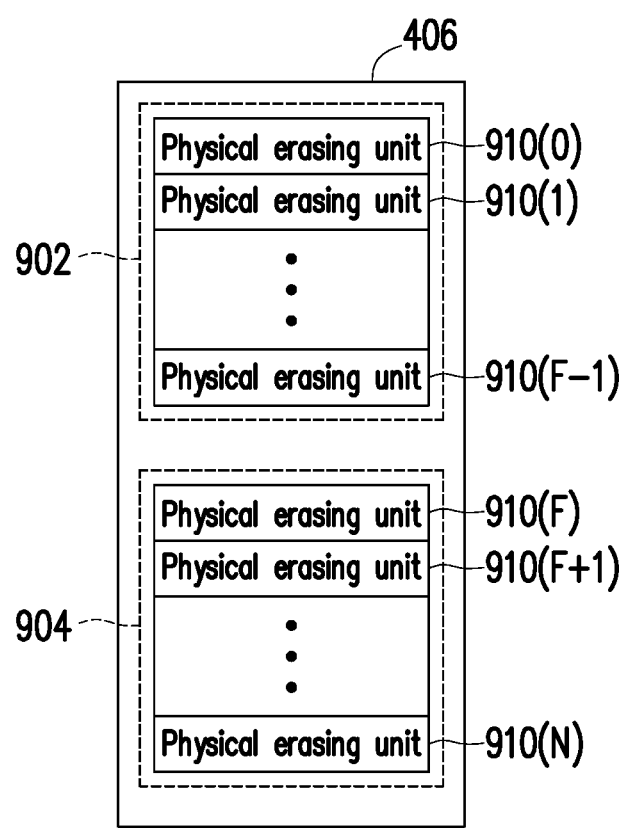
FIG. 9 is an exemplary schematic view of a management physical erasing unit according to an exemplary embodiment.

FIG. 9 is an exemplary schematic view of a management physical erasing unit according to an exemplary embodiment. When the rewritable non-volatile memory module 406 is just shipped from the factory, in order to increase the efficiency of use, the single-page programming mode is set available to program the memory cells in the rewritable non-volatile memory module 406. Referring to FIG. 9, the memory control circuit unit 404 logically groups the physical erasing units 910(0) to 910(N) into a static area 902 (also referred to as a second area) and a dynamic area 904 (also referred to as a first area), and the static area 902 and the dynamic area 904 respectively have corresponding storage capacities. The physical erasing units logically belonging to the static area 902 and the dynamic area 904 are used to store data from the host system 11, wherein the static area 902 includes single-level cells, and the dynamic area 904 includes multi-level cells, trinary level cells or other memory cells that can store two number of bits or more. In other words, the number of bits stored by the memory cells in the dynamic area 904 is greater than the number of bits stored by the memory cells in the static area 902. Specifically, the memory control circuit unit 404 uses the single-page programming mode to program data to the physical erasing units in the static area 902, while the memory control circuit unit 404 can use the single-page programming mode or the multi-page programming mode to program data to the physical erasing units in the dynamic area 904. In general, the optimized value of the write amplification factor (WAF) of each rewritable non-volatile memory module 406 is obtained by performing test operations normalized by Joint Electron Device Engineering Council (JEDEC) on the rewritable non-volatile memory module 406 by the developer of the same before shipping. Moreover, the optimized value of write amplification factor will change due to the different number of physical erasing units included in the static area 902 and the dynamic area 904.

For example, the optimized value of the write amplification factor of the rewritable non-volatile memory module 406 can be obtained by calculation of, for example, the number of physical erasing units in different areas divided by the NAND flash memory module, the preset upper limit of erasing counts and copyback factors. More specifically, the write amplification factor is a parameter that reflects the relationship between the amount of data actually written into the NAND flash memory module and the amount of data requested to be written by the host. In the exemplary embodiment, the optimized value of write amplification factor can be calculated by the following formula (1), for example:

$$WAF = \frac{AREA1\_Blk \times AREA1\_PE}{\dfrac{AREA2\_PE \times AREA2\_Blk}{AREA1\_factor} - } \left( AREA1\_Blk \times AREA1\_PE - \dfrac{AREA2\_Blk \times AREA2\_PE}{AREA1\_factor} \right) \Big/ \text{impact factor}$$ (1)

"WAF" is the optimized value of write amplification factor. "AREA1 Blk" is the number of physical erase units in the first division area. "AREA1 PE" is the preset upper limit of erasing counts for the first division area. "AREA1 factor" is the number of physical erasing units affected by the copyback operation, for example, QLC is 5, TLC is 4. "AREA2 Blk" is the number of physical erasing units in the second division area. "AREA2 PE" is the preset upper limit of erasing counts for the second division area. "Impact factor" is the environmental impact parameter, and the minimum value thereof is AREA1 factor, for example, QLC is 5, TLC is 4, and the maximum value will be adjusted and different according to the use environment or product, for example, applications in company/consumer products or test procedures.

Taking the condition of using single-level cell (SLC) and quad-level cell (QLC) as an example, the optimized value of write amplification factor can be calculated by the following formula (2):

$$WAF = \frac{QLC\_Blk \times QLC\_PE}{\dfrac{SLC\_PE \times SLC\_Blk}{QLC\_factor} - } \left( QLC\_Blk \times QLC\_PE - \dfrac{SLC\_Blk \times SLC\_PE}{QLC\_factor} \right) \Big/ (\text{impact factor})$$ (2)

"WAF" is the optimized value of write amplification factor. "QLC Blk" is the number of physical erase units in the dynamic area 904. "QLC PE" is the preset upper limit of erasing counts for the dynamic area 904. "QLC factor" is the number of physical erasing units affected by the copyback operation, for example, QLC is 5. "SLC Blk" is the number of physical erasing units in the static area 902. "SLC PE" is the preset upper limit of erasing counts for the dynamic area 904. "Impact factor" is the environmental impact parameter, and the minimum value thereof is QLC factor, and the maximum value will be adjusted according to the use environment or product, therefore in this example, "impact factor" is 5 to N, for example.

In the exemplary embodiment, after receiving the write command from the host system 11, the memory control circuit unit 404 periodically calculates the current write amplification factor of the dynamic area 904, and dynamically determines whether the memory control circuit unit 404 should write the data corresponding to the write command into the dynamic area 904 or the static area 902 according to the calculated write amplification factor. Specifically, the current write amplification factor of the rewritable non-volatile memory module 406 can be calculated according to the amount of data written by the host system 11 and the amount of data written into the dynamic area 904. The amount of data written by the host system 11 and the amount of data written into the dynamic area 904 can be recorded in the memory storage apparatus 10.

Specifically, the memory control circuit unit 404 can program the physical erasing units according to the write command. In this exemplary embodiment, the memory control circuit unit 404 calculates the current write amplification factor of the dynamic area 904 after programming each physical erase unit. Generally speaking, the write amplification factor is increased when the memory control circuit unit 404 programs the dynamic area 904, and the write amplification factor is decreased when the static area 902 is programmed.

In detail, the memory control circuit unit 404 determines whether the current write amplification factor of the dynamic area 904 is greater than a preset threshold. When the memory control circuit unit 404 determines that the current write amplification factor of the dynamic area 904 is not greater than (i.e., less than or equal to) the preset threshold, the data corresponding to the subsequent write command is written into the dynamic area 904. Conversely, when the memory control circuit unit 404 determines that the current write amplification factor of the dynamic area 904 is greater than the preset threshold, the data corresponding to the subsequent write command is written into the static area 902. In the exemplary embodiment, the preset threshold is, for example, the optimized value of the foregoing write amplification factor. In other embodiments, the preset threshold can also be set to other values, the disclosure is not limited thereto.

In this embodiment, if the memory control circuit unit 404 determines to write data into the dynamic area 904, the memory control circuit unit 404 will use the single-page programming mode and the multi-page programming mode to program the memory cells in the dynamic area 904. More specifically, the memory control circuit unit 404 will use the single-page programming mode to program the memory cells in the dynamic area 904. Thereafter, the data stored in the dynamic area 904 will be operated through a copyback operation, wherein the copyback operation is performed by copying the data of the plurality of physical erasing units written into the dynamic area 904 into one of the plurality of physical erasing units of the dynamic area 904 by using the multi-page programming mode.

The copyback operation is the operation of moving data between physical erasing units. For example, the memory control circuit unit 404 can, for example, perform the copyback operation to copy the data of four physical erasing units programmed by using the single-page programming mode in the dynamic area 904 into one physical erasing unit in the dynamic area 904 by using the multi-page programming mode. It should be noted that the person of ordinary skill in the art should know how to perform the copyback operation, so details are not narrated here.

In addition, in another embodiment, if the memory control circuit unit 404 determines to write the data into the static area 902, then the memory control circuit unit 404 will copy the written data to the dynamic area 904 after writing the data. Specifically, when the memory control circuit unit 404 writes the data into the static area 902, the memory control circuit unit 404 uses the single-page programming mode to program the memory cells in the static area 902. More specifically, the memory control circuit unit 404 uses the single-page programming mode to program the memory cells in the static area 902. Thereafter, the data stored in the static area 902 will be operated through the copyback operation, wherein the copyback operation is performed by copying the data of the plurality of physical erasing units written into the static area 902 into one of the physical erasing units in the dynamic area 904 by using the multi-page programming mode. For example, the memory control circuit unit 404 can, for example, perform the copyback operation to copy the data of four physical erasing units programmed by using the single-page programming mode in the static area 902 into one physical erasing unit in the dynamic area 904 by using the multi-page programming mode. It should be noted that the person of ordinary skill in the art should know how to perform the copyback operation, so details are not narrated here.

In another exemplary embodiment, the memory control circuit unit 404 may start to use the write amplification factor to determine the writing area of data only at the end of the life cycle of the memory storage apparatus 10. Therefore, the memory control circuit unit 404 uses the current life cycle parameters of the rewritable non-volatile memory module 406 to determine whether to start using the write amplification factor to determine the data-writing area. In the embodiment, the life cycle parameters can be one of TeraBytes Written (TBW), Program/Erase count (P/E count) and bit error rate or a combination of the foregoing, the disclosure is not limited thereto.

Specifically, the memory control circuit unit 404 determines whether to execute the general write mode (also referred to as the first write mode) or the special write mode (also referred to as the second write mode) based on the life cycle parameters of the rewritable non-volatile memory module 406.

For example, after receiving the write command from the host system, the memory control circuit unit 404 will determine whether the life cycle parameter is greater than the preset cycle threshold. If the memory control circuit unit 404 determines that the life cycle parameter is not greater than the preset cycle threshold, it means that the memory storage apparatus 10 is still in the early stage of its life cycle. Therefore, the memory control circuit unit 404 executes the general write mode, that is, directly writing data into the dynamic area 904. Conversely, if the memory control circuit unit 404 determines that the life cycle parameter is greater than the preset cycle threshold, it means that the memory storage apparatus 10 has reached the end of its life cycle. Therefore, the memory control circuit unit 404 performs the special write mode, that is, determining to write data into the dynamic area 904 or the static area 902 first according to the write amplification factor of the dynamic area 904. It should be noted that the specific description of the special write mode is as described above, so details are not narrated here. It should be noted that the preset cycle threshold can be preset before shipping. Taking TeraBytes Written as an example, the preset cycle threshold corresponding to TeraBytes Written is, for example, 40 T (Terabyte). The disclosure is not limited thereto.

In another exemplary embodiment, when the memory storage apparatus 10 is connected to the host system 11, the disclosure can provide the available memory space of the memory storage apparatus 10 for the user's reference. Specifically, the memory control circuit unit 404 has the actual total space when being shipped from the factory. However, the foregoing exemplary embodiment illustrates that if data is written into the static area 902, the written data is copied to the dynamic area 904 after writing the data. In other words, the static area 902 is only used for temporarily storing data in practice. Therefore, in the exemplary embodiment, when calculating the space size of the rewritable non-volatile memory module 406, the space size does not include the storage capacity corresponding to the static area 902.

Figure 10:
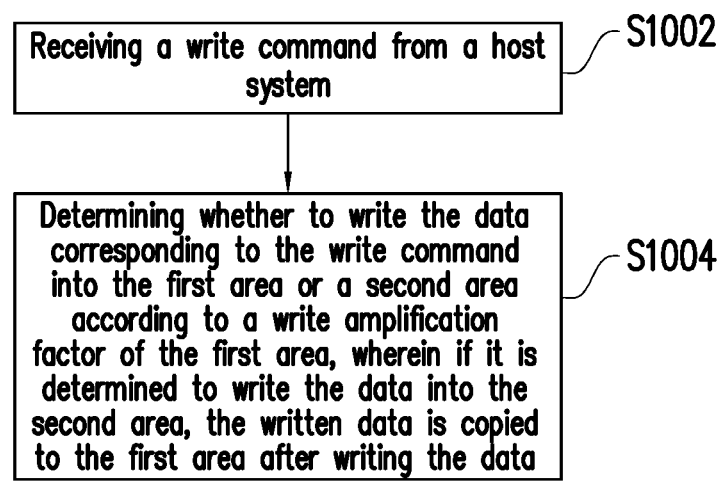
FIG. 10 is a flowchart of a data writing method according to an exemplary embodiment.

FIG. 10 is a flowchart of a data writing method according to an exemplary embodiment. In step S1002, the write command is received from the host system. In step S1004, it is determined whether to write the data corresponding to the write command into the first area or the second area according to the write amplification factor of the first area, wherein if it is determined to write the data into the second area, then the written data is copied to the first area after writing the data.

Figure 11:
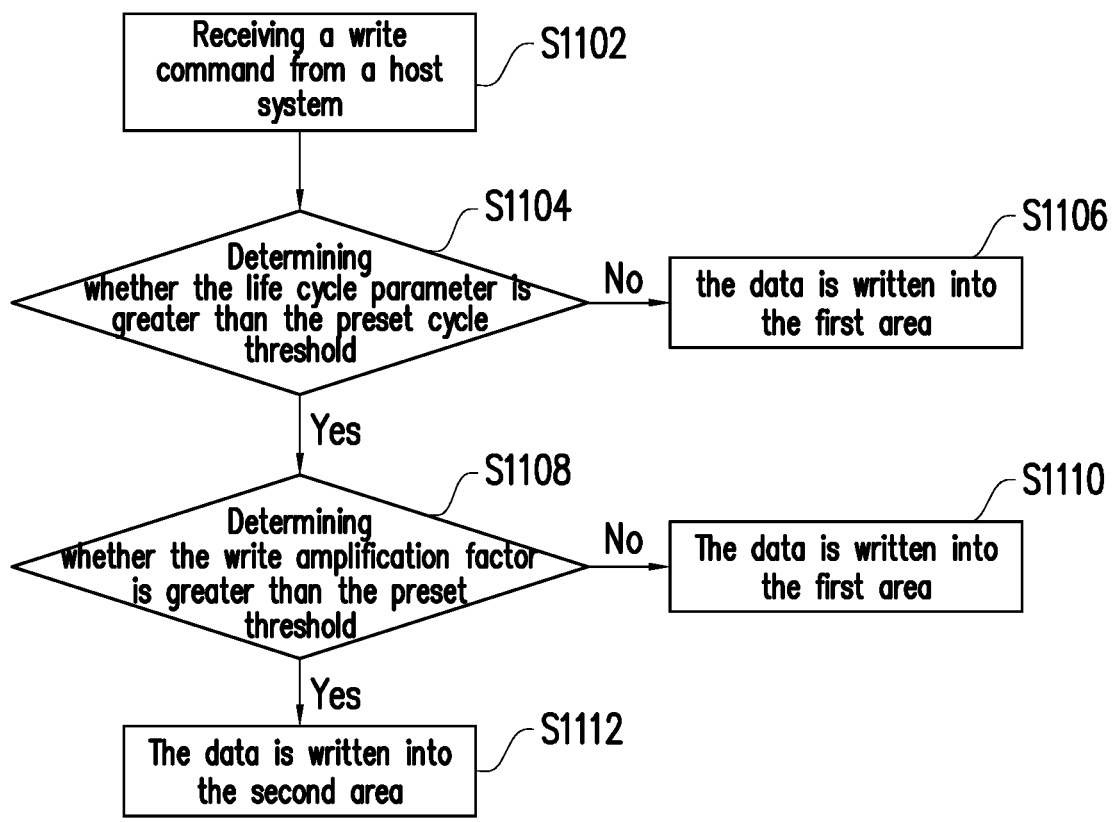
FIG. 11 is a flowchart of a data writing method according to an exemplary embodiment.

FIG. 11 is a flowchart of a data writing method according to an exemplary embodiment. In step S1102, the write command is received from the host system. In step S1104, it is determined whether the life cycle parameter is greater than the preset cycle threshold. If it is determined that the life cycle parameter is not greater than the preset cycle threshold (step S1104, the determining result is NO), then in step S1106, the data is written into the first area. If it is determined that the life cycle parameter is greater than the preset cycle threshold (step S1104, the determining result is YES), then in step S1108, it is determined whether the write amplification factor is greater than the preset threshold. If it is determined that the write amplification factor is not greater than the preset threshold (step S1108, the determining result is NO), then the data is written into the first area in step S1110. If it is determined that the write amplification factor is greater than the preset threshold (step S1108, the determining result is YES), then the data is written into the second area in step S1112.

It should be noted that the steps in FIG. 10 and FIG. 11 can be implemented as multiple program codes or circuits, the disclosure is not limited thereto. In addition, the methods in FIG. 10 and FIG. 11 can be used together with the above exemplary embodiments, or can be used alone, the disclosure is not limited thereto.

In summary, the data writing method, the memory control circuit unit and the memory storage apparatus in the embodiments of the disclosure can calculate the current write amplification factor of the dynamic area and dynamically determine whether to write data into the dynamic area or the static area according to the calculated amplification factor. The embodiment of the disclosure affects the value of the write amplification factor by adjusting the ratio of data written into the dynamic area or the static area. In this way, it is possible to control the service life of the dynamic area and the static area to prevent the static area from reaching the end of service life early, such that the two areas can simultaneously reach the end of service life while the service life of the memory storage apparatus can be maximized and optimized.

Although the present disclosure has been disclosed in the above embodiments, it is not intended to limit the present disclosure, and those skilled in the art can make some modifications and refinements without departing from the spirit and scope of the disclosure. Therefore, the scope of the present disclosure is subject to the definition of the scope of the appended claims.

What is claimed is:

1. A data writing method for a memory storage apparatus, the memory storage apparatus having a rewritable non-volatile memory module, the rewritable non-volatile memory module comprising a plurality of areas, each of the plurality of areas comprising a plurality of physical erasing units, and each of the plurality of physical erasing units having a plurality of memory cells, wherein the plurality of areas comprises a first area and a second area, and the data writing method comprising:

receiving a write command from a host system;
calculating a write amplification factor (WAF) of the first area according to an amount of data previously written by the host system and an amount of data previously written to the first area; and determining, according to the write amplification factor of the first area of the plurality of areas, whether to write a first data corresponding to the write command into the first area or the second area of the plurality of areas, wherein if it is determined to write the first data into the second area, the written first data is copied to the first area after writing the first data, wherein the first area includes memory cells which store two or more number of bits per memory cell and the second area includes memory cells which store one bit per memory cell.

2. The data writing method according to claim 1, wherein step of determining, according to the write amplification factor of the first area of the plurality of areas, whether to write the first data corresponding to the write command into the first area or the second area of the plurality of areas comprises:

writing the first data into the second area when the write amplification factor is greater than a preset threshold; and writing the first data into the first area when the write amplification factor is not greater than the preset threshold.

3. The data writing method according to claim 1, wherein if it is determined to write the first data into the first area, a first programming mode and a second programming mode are employed to program the plurality of memory cells in the first area.

4. The data writing method according to claim 3, wherein the number of bits stored by the memory cells programmed by using the first programming mode is less than the number of bits stored by the memory cells programmed by using the second programming mode.

5. The data writing method according to claim 3, wherein the step of using the first programming mode and the second programming mode to program the plurality of memory cells in the first area comprises:

using the first programming mode to program the plurality of memory cells in the first area; and copying data of the plurality of physical erasing units written into the first area to another one of the plurality of physical erasing units in the first area by using the second programming mode through a copyback operation.

6. The data writing method according to claim 1, wherein if it is determined to write the first data into the second area, a first programming mode is used to program the plurality of memory cells in the second area.

7. The data writing method according to claim 6, wherein the step of copying the written first data into the first area after writing the first data comprises:

copying data of the plurality of physical erasing units written into the second area to one of the plurality of physical erasing units in the first area by using the second programming mode through a copyback operation.

8. The data writing method according to claim 1, wherein the step of determining, according to the write amplification factor of the first area of the plurality of areas, whether to write the first data corresponding to the write command into the first area or the second area of the plurality of areas comprises:

determining whether to execute a first write mode or a second write mode according to life cycle parameters of the rewritable non-volatile memory module, in the first write mode, writing the corresponding first data into the first area, and in the second write mode, determining whether to write the first data into the first area or the second area according to the write amplification factor of the first area.

9. The data writing method according to claim 1, wherein the number of bits stored by the memory cells in the first area is greater than the number of bits stored by the memory cells in the second area.

10. The data writing method according to claim 1, wherein the plurality of areas respectively have corresponding storage capacities, and when calculating a space size of the rewritable non-volatile memory module, the space size does not comprise the storage capacity corresponding to the second area.

11. A memory control circuit unit, comprising:

a host interface configured to be coupled to a host system;

a memory interface configured to be coupled to a rewritable non-volatile memory module, wherein the rewritable non-volatile memory module comprises a plurality of areas, each of the plurality of areas comprises a plurality of physical erasing units, each of the plurality of physical erasing units has a plurality of memory cells, wherein the plurality of areas comprises a first area and a second area; and a memory management circuit comprising a processor coupled to the host interface and the memory interface, wherein the memory management circuit is configured to receive a write command from the host system, the memory management circuit is further configured to calculate a write amplification factor (WAF) of the first area according to an amount of data previously written by the host system and an amount of data previously written to the first area, and the memory management circuit is further configured to determine, according to the write amplification factor of the first area of the plurality of areas, whether to write a first data corresponding to the write command into the first area or the second area of the plurality of areas, wherein it if is determined to write the first data into the second area, the written first data is copied into the first area after writing the first data, wherein the first area includes memory cells which store two or more number of bits per memory cell and the second area includes memory cells which store one bit per memory cell.

12. The memory control circuit unit according to claim 11, wherein in the operation that the memory management circuit is further configured to determine, according to the write amplification factor of the first area of the plurality of areas, whether to write the first data corresponding to the write command into the first area or the second area of the plurality of areas, writing the first data into the second area when the write amplification factor is greater than a preset threshold, and writing the first data into the first area when the write amplification factor is not greater than the preset threshold.

13. The memory control circuit unit according to claim 11, wherein if it is determined to write the first data into the first area, the memory management circuit is further configured to use a first programming mode and a second programming mode to program the plurality of memory cells in the first area.

14. The memory control circuit unit according to claim 13, wherein the number of bits stored by the memory cells programmed by the memory management circuit by using the first programming mode is less than the number of bits stored by the memory cells programmed by using the second programming mode.

15. The memory control circuit unit according to claim 13, wherein in the operation that the memory management circuit is further configured to use the first programming mode and the second programming mode to program the plurality of memory cells in the first area,
using the first programming mode to program the plurality of memory cells in the first area, and
copying data of the plurality of physical erasing units written into the first area to another one of the plurality of physical erasing units in the first area by using the second programming mode through a copyback operation.

16. The memory control circuit unit according to claim 11, wherein if it is determined to write the first data into the second area, the memory management circuit is further configured to use a first programming mode to program the plurality of memory cells in the second area.

17. The memory control circuit unit according to claim 16, wherein in the operation of copying the written first data into the first area after writing the first data,
the memory management circuit is further configured to copy data of the plurality of physical erasing units written into the second area to one of the plurality of physical erasing units in the first area by using the second programming mode through a copyback operation.

18. The memory control circuit unit according to claim 11, wherein in the operation that the memory management circuit is further configured to determine, according to the write amplification factor of the first area of the plurality of areas, whether to write the first data corresponding to the write command into the first area or the second area of the plurality of areas,
determine whether to execute a first write mode or a second write mode according to life cycle parameters of the rewritable non-volatile memory module,
in the first write mode, write the corresponding first data into the first area, and
in the second write mode, determine whether to write the first data into the first area or the second area according to the write amplification factor of the first area.

19. The memory control circuit unit according to claim 11, wherein the number of bits stored by the memory cells in the first area is greater than the number of bits stored by the memory cells in the second area.

20. The memory control circuit unit according to claim 11, wherein the plurality of areas respectively have corresponding storage capacities, and when the memory management circuit calculates a space size of the rewritable non-volatile memory module, the space size does not comprise the storage capacity corresponding to the second area.

21. A memory storage apparatus, comprising:
a connection interface unit configured to be coupled to a host system;
a rewritable non-volatile memory module comprising a plurality of areas, each of the plurality of areas comprising a plurality of physical erasing units, and each of the plurality of physical erasing units having a plurality of memory cells, wherein the plurality of areas comprises a first area and a second area; and
a memory control circuit unit, coupled to the connection interface unit and the rewritable non-volatile memory module,
wherein the memory control circuit unit is configured to receive a write command from the host system,
the memory control circuit unit is further configured to calculate a write amplification factor (WAF) of the first area according to an amount of data previously written by the host system and an amount of data previously written to the first area, and
the memory control circuit unit is further configured to determine, according to the write amplification factor of the first area of the plurality of areas, whether to write a first data corresponding to the write command into the first area or the second area of the plurality of areas, wherein if it is determined to write the first data into the second area, the written first data is copied into the first area after writing the first data,
wherein the first area includes memory cells which store two or more number of bits per memory cell and the second area includes memory cells which store one bit per memory cell.

22. The memory storage apparatus according to claim 21, wherein in the operation that the memory control circuit unit is further configured to determine, according to the write amplification factor of the first area of the plurality of areas, whether to write the first data corresponding to the write command into the first area or the second area of the plurality of areas,
writing the first data into the second area when the write amplification factor is greater than a preset threshold, and
writing the first data into the first area when the write amplification factor is not greater than the preset threshold.

23. The memory storage apparatus according to claim 21, wherein if it is determined to write the first data into the first area, the memory control circuit unit is further configured to use a first programming mode and a second programming mode to program the plurality of memory cells in the first area.

24. The memory storage apparatus according to claim 23, wherein the number of bits stored by the memory cells programmed by the memory control circuit unit by using the first programming mode is less than the number of bits stored by the memory cells programmed by using the second programming mode.

25. The memory storage apparatus according to claim 23, wherein in the operation that the memory control circuit unit is further configured to use the first programming mode and the second programming mode to program the plurality of memory cells in the first area,
using the first programming mode to program the plurality of memory cells in the first area, and
copying data of the plurality of physical erasing units written into the first area to another one of the plurality of physical erasing units in the first area by using the second programming mode through a copyback operation.

26. The memory storage apparatus according to claim 21, wherein if it is determined to write the first data into the second area, the memory control circuit unit is further configured to use a first programming mode to program the plurality of memory cells in the second area.

27. The memory storage apparatus according to claim 26, wherein in the operation of copying the written first data into the first area after writing the first data, the memory control circuit unit is further configured to copy data of the plurality of physical erasing units written into the second area to one of the plurality of physical erasing units in the first area by using the second programming mode through a copyback operation.

28. The memory storage apparatus according to claim 21, wherein in the operation that the memory management circuit is further configured to determine, according to the write amplification factor of the first area of the plurality of areas, whether to write the first data corresponding to the write command into the first area or the second area of the plurality of areas, determine whether to execute a first write mode or a second write mode according to life cycle parameters of the rewritable non-volatile memory module, in the first write mode, write the corresponding first data into the first area, and in the second write mode, determine whether to write the first data into the first area or the second area according to the write amplification factor of the first area.

29. The memory storage apparatus according to claim 21, wherein the number of bits stored by the memory cells in the first area is greater than the number of bits stored by the memory cells in the second area.

30. The memory storage apparatus according to claim 21, wherein the plurality of areas respectively have corresponding storage capacities, and when the memory control circuit unit calculates a space size of the rewritable non-volatile memory module, the space size does not comprise the storage capacity corresponding to the second area.

* * * * *